March 23, 1965 H. R. WILBOURN, JR 3,175,039
PPCS TOLL TICKETING TELEPHONE SYSTEM
Filed April 16, 1962
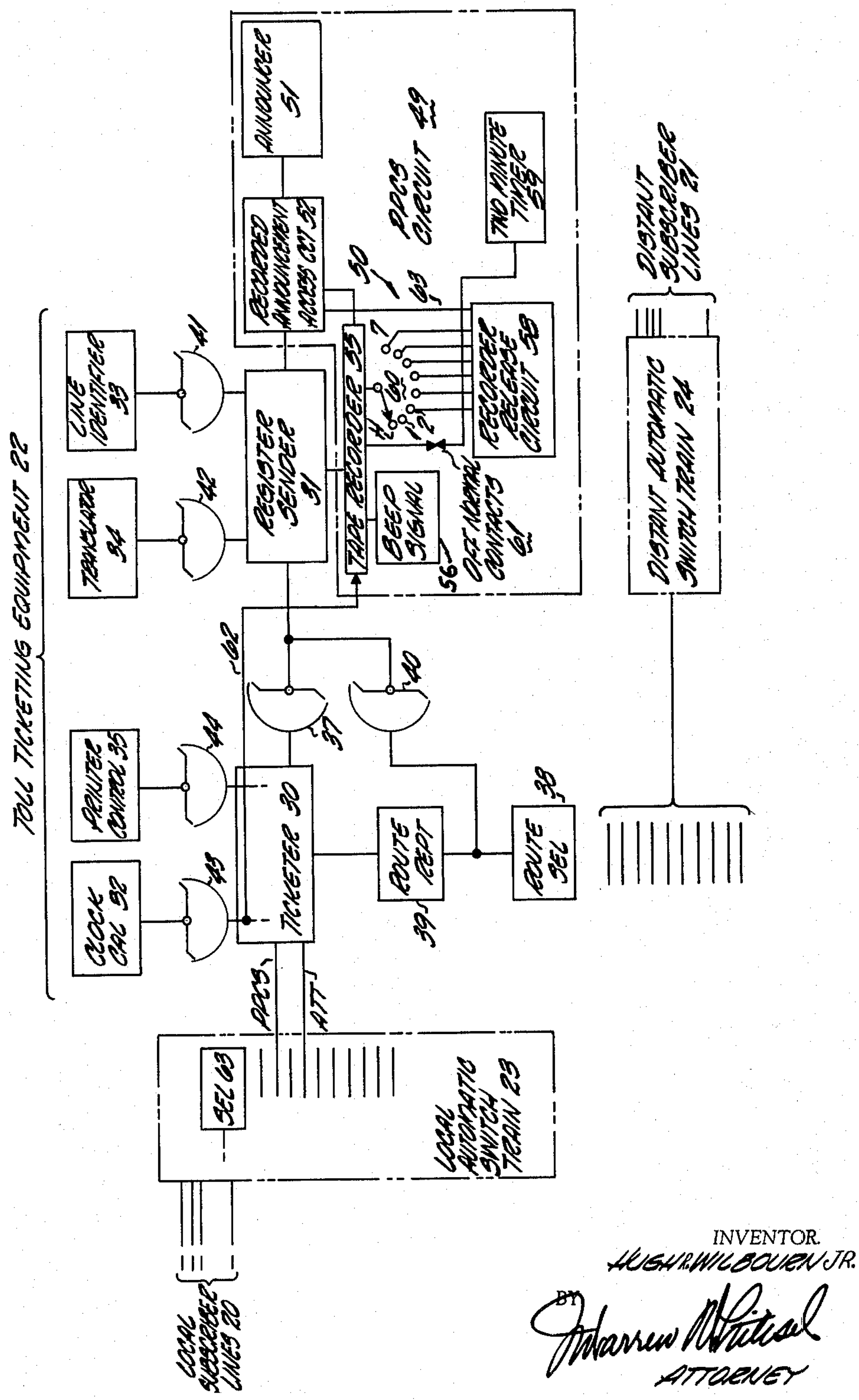
INVENTOR.
HUGH R. WILBOURN JR.
BY
ATTORNEY United States Patent Office 3,175,039
Patented Mar. 23, 1965

3,175,039
PPCS TOLL TICKETING TELEPHONE SYSTEM

Hugh R. Wilbourn, Jr., Conway, Ark.
(P.O. Box 2177, Little Rock, Ark.)

Filed Apr. 16, 1962, Ser. No. 187,614
15 Claims. (Cl. 179—7.1)

This invention relates to automatic toll ticketing telephone systems and more particularly to systems for ticketing person-to-person, collect, and special service (PPCS) calls.

Originally, all telephone calls were completed on a manual basis. That is, an operator responds to a calling signal, learns the identity of a called subscriber, and uses plug-and-jack connectors to interconnect the calling and called stations. This manual operation is extremely slow and cumbersome. Moreover, it severely limits the growth of communication facilities, and therefore, the economic growth of the country. For example, a recent survey indicates that if every woman in the U.S. were a manual telephone operator, their combined efforts would not be adequate to complete the telephone calls in the U.S.

The telephone was hardly invented before a trend began to transfer the work of establishing calls from the operators to the subscribers. In the beginning, the subscriber learned to push buttons and turn cranks to operate a few switches and gadgets. Then he learned to manipulate a dial and thereby operate large, complex, switching systems. More recently, he learned to complete toll calls by following established dialing procedures. For example, he has learned to dial a three digit area code, a seven digit called number, and sometimes a calling line or party identifying number which may also include as many as seven digits. Responsive thereto, automatic ticketing equipment prints a bill or makes other suitable records to charge the calling party for the call.

Through it all, the so-called PPCS type of call has defied all previous attempts at complete mechanization or toll ticketing. To make the PPCS calls before this invention, a calling party still had to call an operator who places a call, challenges a called party, and makes a toll ticket if the parties accept the call. When toll ticketing equipment is used during a PPCS call, that equipment switches the calling subscriber to the operator who then supervises the call, as before. This is because no manipulation of a dial will prove that a called person has answered a person-to-person call. Nor will it prove that a called person will accept charges. Thus, there has been no practical way to eliminate PPCS operators.

This need for human operators to complete PPCS calls has economic effects which reach far beyond the needs of PPCS calls, per se. First, if an office requires an operator to complete these PPCS calls, it is sometimes uneconomical to install automatic toll ticketing equipment to handle other calls. Instead, it is better to let the PPCS operator complete all toll calls. Second, if an operating company installs automatic toll ticketing equipment and eliminates the PPCS operator, it may be necessary to route all PPCS calls through other offices owned by another operating company which does provide PPCS operators. One result has been a devistating loss of revenue for the small company. More particularly, in the U.S., all telephone toll charges are divided into A, B and C commissions. The "A" commission is paid to the operating company that owns a calling subscriber line from which a toll call is made. The "B" commission is paid to the operating company that makes the toll ticket for such a call. The "C" commission is paid to the long lines company that hauls the call. The small company needs to capture the B commissions to survice; to capture this B commission is must provide PPCS service.

Accordingly, an object of this invention is to provide new and improved automatic toll ticketing systems. In particular, an object is to provide for automatically ticketing PPCS calls. In this connection, an object is to give a calling subscriber complete control over toll ticketing apparatus which enables the calling subscriber to challenge a called party without requiring the services of an operator.

Another object of the invention is to give an operating telephone company the machinery required to detect the successful completion of PPCS calls without requiring the intervention of human operators. More particularly, an object of the invention is to enable small operating telephone companies to give complete PPCS service. Here, an object is to provide such service by means of an applique circuit which may be added to either new or existing automatic toll ticketing equipment. Thus, an object is to give such service with a minimum amount of applique equipment which may be added to many different types of existing equipment at minimum cost and with a minimum amount of modification.

In accordance with one aspect of this invention, a PPCS applique circuit is adapted to be connected into either new or existing automatic toll ticketing systems. The applique circuit includes a recording unit, an announcer unit, and an access circuit. The access circuit is tailored to fit the recording and announcer units into any type of automatic toll ticketing systems. Thus, the applique circuit has wide general use.

To place a PPCS call, a calling subscriber first consults a directory and learns of an access code which identifies the type of service that he desires. Then, he dials a prefix code and gains access to the announcer unit which plays back a recorded message giving special instructions for completing the call. By following the instructions, he will (1) provide the toll ticketing system with all necessary billing information, (2) determine that the proper called party has answered, or (3) determine that the charges for a collect call will be accepted, or (4) secure any other information required to complete the call. The recording unit makes a record of all conversation (or other electrical signals) on the line, thus providing a telephone company with means of determining whether or not the call is completed. This way, the telephone company can discover any would-be cheaters. Upon learning that the PPCS call can be completed, the calling subscriber dials a special digit to release the recorder and gain privacy for the call.

The above mentioned and other features and objects of this invention and the manner of obtaining them will become more apparent and the invention itself will be best understood by reference to the following description of an embodiment of the invention taken in conjunction with the accompanying drawing, in which a block diagram shows how equipment embodying the invention may be combined with toll ticketing equipment to give PPCS service.

Briefly, the drawing shows a telephone system which includes local and distant subscriber lines 20, 21, automatic toll ticketing equipment 22, and a local automatic switch train 23, and a distant automatic switch train 24. If a subscriber served by local lines 20 dials a number which identifies a local called line, the local switch train 23 seizes and signals that called line. If, on the other hand, a local subscriber dials a number that identifies a distant called line 21, the local switch train 23 seizes the automatic toll ticketing equipment 22 which makes a record of the charges to be billed. Except for PPCS calls, this seizure is via an automatic toll ticketing point of access, ATT. For PPCS calls, seizure is via the access designated PPCS. After extracting the information required to complete a toll ticket, equipment 22 causes the call to be extended through a distant switch train 24 to the distant called line 21.

The automatic toll ticketing equipment 22 may include any well-known circuitry, either new equipment which is to be installed or existing equipment that is already installed and operating. The particular circuitry that is shown here includes a ticketer 30 and a register sender 31 which receive and store the information required to extend a call and make a toll ticket. That information may be derived primarily from dial pulses sent by a calling subscriber over a local line in group 20. The information may also be generated by common equipment, such as a clock-calendar 32 which inserts time and date information into ticketer 30. Another piece of common equipment is a line identifier 33 which provides the ticketer with digital information that identifies a calling line. Yet another piece of common equipment is a translator 34 which changes any of the stored information from one form to another. Thus, if local switch train 23 uses decimal pulses and the distant switch train 24 uses a two-out-of-five code, the translator 34 converts decimal pulses into two-out-of-five codes and vice versa. Finally, a piece of common equipment that is used after a call is completed is a printer control circuit 35 that actually makes a toll ticket from the information stored in the ticketer.

The various circuits in the toll ticketing equipment 22 are selectively interconnected by means of conventional electromechanical switches, one of which is shown at 37. This type of a switch may be either a minor or a rotary switch. Another electromechanical switch 38, which may be a step-by-step switch for example, gives the toll ticketing equipment 22 access to a distant switch train 24. A repeater circuit 39 drives the switch 38 and the switch train 24 in accordance with the routing information stored in the ticketer 30 and register sender 31.

The toll ticketing equipment 22 operates this way. Before a toll call is placed, switch 37 operates to preassign the register 31 to serve the ticketer 30. When a call comes in, the called number digits are put into temporary storage in register sender circuit 31 and into permanent storage in ticketer 30. Thereafter, the register sender 31 transmits switch directing pulses through switch 40 to route selector 38 and distant automatic switch train 24. If information relative to line identification or translation is provided, this information is sent from circuits 33, 34, respectively, through switches 41, 42, register sender 31 and switches 37 and 40 to the ticketer 30 or route selector 38. After switch train 24 is set and the line identification is stored in ticketer 30, the switches 37 and 40 normally step on to assign register sender 31 to serve the next idle ticketer in preparation for the next call. Thereafter, the ticketer completes and controls the call via route repeater 39.

At an appropriate time, the ticketer 30 operates switch 43 to secure time and date information from the clock-calendar circuit 32. Then, the switch 43 releases immediately and the clock-calendar is ready to be assigned to a ticketer serving the next call.

When the call is completed, switch 44 operates to interconnect ticketer 30 and a printer control circuit 35. Then information stored in the ticketer 30 causes the printer control circuit to make a toll ticket. Thereafter, a switch such as 37 assigns an idle register sender, such as 31, to serve the ticketer 30 during the next call.

The foregoing description of toll ticketing equipment 22 has assumed that particular conventional equipment operates in a particular and well known way. This facilitated an explanation. However, the description could also have assumed that other well known equipment is provided. For example, sometimes it may be convenient to combine the ticketer 30 with the register sender 31. This will eliminate the switches 37 and 40. Those skilled in the art will readily perceive how other changes may be made in equipment 22.

In keeping with one aspect of this invention, an applique circuit adapts the toll ticketing equipment to give PPCS service. This applique circuit 49 may include a recording unit 50 and an announcer unit 51. The applique circuit is connected to the register sender 31 via an access circuit 52 which tailors the applique to the system needs. This way the applique circuit may be added to virtually any toll ticketing equipment, either new or installed and operating.

The recording unit 50 includes an audio monitor device 55 for recording all voice signals and other electrical signal conditions occurring on a line during a PPCS call. While this device may take any suitable form, the invention contemplates the use of a magnetic tape recorder. In addition, the monitor device 50 includes a source of "Beep" tone 56 which meets the requirements of the U.S. Federal Communications Commission. The beep recurs every few seconds and constantly reminds the conversing subscribers that their call is being monitored. A release circuit 58 is adapted to disconnect the audio monitor unit 50 from the line responsive to a coded release signal. Alternatively, a timer 59 automatically releases a PPCS call if a coded release signal is not received within a fixed time period. Here the fixed time period is arbitrarily shown as an exemplary two minutes.

In construction, a device 60, which responds to the coded release signals, may take many different forms. It is here shown as a stepping switch which is driven to a particular terminal in accordance with the numerical value of the coded release signal that is dialled by the calling subscriber. The switch 60 has unwired home "H" and first step "1" positions. Thus, if a subscriber bounces a hook switch to imitate the digit one, there is no immediate effect on step "1." Rather, the switch 60 automatically releases in a well known manner. The remaining switch 60 positions "2–7" represent billable rates and are wired into the release circuit 58 to cause release under a number of different conditions. A circuit from the two minute timer by-passes the switch brushes through off-normal contacts 61. Thus, if the switch 60 is not stepped to one of its positions 2–7 before the end of two minutes, the timer 59 feeds a signal through the off-normal contacts 61 to release the call. If the switch is in one of the positions 2–7, contacts 61 are open and timer 59 has no effect.

The announcer 51 has a number of recorded messages giving instructions for completing different types of PPCS calls. In one particular circuit, five recorded messages are provided. An access circuit 52 selects and causes play back of one of these messages responsive to a coded class-of-service prefix digit. After the message is played back, the announcer 51 is immediately released so that it will be ready to serve another PPCS call. The announcer is particularly useful in areas where subscribers are not familiar with the routine for placing PPCS calls. For example, recorded instructions would be extremely helpful immediately after a PPCS system is installed and in rural areas where PPCS calls are not too common. On the other hand, in large metropolitan areas where a subscriber may originate many PPCS calls every day, the subscriber would object to listening to repeated play back of recorded messages. Thus, the invention contemplates provision of means in access circuit 52 of cutting off the announcer if the subscriber proceeds immediately to follow the required PPCS procedures. The invention also contemplates provision in the access circuit 52 for eliminating the announcer 51. In the latter event, subscribers would receive their instructions from a directory.

While the content of the messages played back by the announcer 51 will be adapted to serve the needs of a particular system, it may be helpful to explain how the needs of one particular system are served. In that system, the coded class-of-service access signals are assigned the following meanings:

| Code | Meaning |
|---|---|
| 2 | Pre-pay station-to-station call. |
| 3 | Collect station-to-station call. |
| 4 | Pre-pay person-to-person call. |
| 5 | Collect person-to-person call. |
| 6 | Special service station-to-station call. |
| 7 | Special service person-to-person call. |

Of these, only the first (a pre-pay station-to-station call) can be completed by the conventional automatic toll ticketing equipment 22. The remaining five types of calls may require the recorded announcements provided by circuit 51. One exemplary announcement might be as follows:

"You have placed a pre-paid, person-to-person, telephone call. To complete this call, dial the area code and station number of the called party. When your call is answered, you will hear a beep signal which indicates that your conversation is being recorded. Then, please ask for the person who you are calling. When you are satisfied that the person who you have called has answered, dial '4.' After you have dialed '4,' the recorder will be disconnected and your call will be completely private. The recording that is made while you hear the beep signal will be monitored to secure billing information. Therefore, you will not be charged if your person-to-person call does not reach the called party."

Means are provided for positively associating a voice recording with a toll ticket so that the voice recording and ticket of a call may be compared for billing purposes. In greater detail, the conductor 62 indicates a connection between the clock-calendar circuit 32 and the tape recorder 55. The connection is preferably extended through the ticketer 30 so that electrical signals from the clock-calendar are stored simultaneously in the ticketer 30 and on the tape of recorder 55. This connection 62 could be extended via a level in switch 37. Both the ticketer 30 and recorder 55 also store an identification of the register sender 31. Since only one call goes through the identified register at the time when the clock-calendar out pulses, the recording is positively identified as belonging to a specific toll ticket. This way the tape and ticket may be compared for billing purposes.

The PPCS toll ticketing system operates this way. A calling subscriber served by lines 20, dials an access code which drives a selector 63 to seize the toll ticketing equipment 22 via a person-to-person, collect, and special service point of access (PPCS). The ticketer 30 recognizes the PPCS nature of the call by the point of access over which it is seized. Also, the ticketer recognizes the one type of PPCS call from the code number dialed by the subscriber. For example, if the subscriber dials an access code having the code numeral "4," the calling subscriber commits himself to pay for a person-to-person call. A symbol is later printed on the toll ticket to indicate this commitment. The register sender 31 also directs the code numeral digit into the access circuit 52 which selects the one of the recorded messages that explains how to complete a pre-pay, person-to-person call. That message is played back from circuit 51 through circuits 52, 31, 37, 30, selector 63, and the local switch train 23 to the calling subscriber line 20.

Following either the recorded instructions or instructions found in a telephone directory, the calling subscriber dials the digits required to set route selector 38 and distant automatic switch train 24 to seize a called line 21. The called line is rung. When the called subscriber answers, an answer supervision signal is returned to the toll ticket equipment 22.

Responsive to the receipt of answer supervision, the tape recorder 55 is connected to record all voice or other signals on the completed talking circuit. Beep signals are applied from circuit 56 to the line. After the calling person has satisfied himself that the called person has answered, the calling person dials a predetermined code digit to set the switch 60 and start the toll ticket billing time. This setting of switch 60 determines the conditions under which the recorder 55 is released. If this digit is not dialed, the timer 59 releases the call after two minutes. In any event until released, the recorder 55 makes a record of everything that is said on the line.

It may be recalled that the calling subscriber originally committed himself to pay for a particular type of call when he dialed a prefix code to seize access circuit 52. In the above cited example, it was assumed that the subscriber committed himself to a pre-pay, person-to-person call by dialing "4." The conductor 63 provides a path for comparing the class-of-service digit originally stored in the register sender 31 with the class-of-service digit dialed to release the tape recorder. In the cited example, the expected comparison is that switch 60 has been driven by a digit "4."

The question now is, "What happens if the subscriber dials any digit except '4' to lease the tape recorder 55?" The answer to this rhetorical question depends upon the billing practices of the telephone company. Under one billing practice the call is released if any digit except "4" (in the cited example) is dialed. Under another practice, a diode network connected between the terminals "2–7" of switch 60 allows the calling subscriber to select any type of call having a billing rate equal to or greater than the originally selected rate, with release if a lessor billing rate is selected. Under yet another practice, the subscriber may dial any digit to drive switch 60 and complete a call. If the original code digit does not match that dialed to release the recorder, a special symbol is printed on the toll ticket. This would require special attention from a billing clerk.

During a period of slack traffic, a billing clerk listens to the recording made by recorder 55 and compares what she hears with the toll tickets made by equipment 22. If she finds that a subscriber actually did complete a call but failed to dial to release the recorder and start billable ticketing, she will mark the ticket for billing as if the release digit had been dialed. Experience has shown that, for a small office, all recordings for one entire day may be monitored in about one hour. This is because the recorder is normally connected to the line only during the time following answer supervision and preceding the release code digit. This is the time required by the calling person to challenge the called person and determine that a call has been completed.

Upon reflection, it will be seen that this invention provides toll ticketing equipment for giving PPCS service without requiring human operators. In particular, the invention gives the calling subscriber a control over toll ticketing apparatus which enables such calling subscriber to challenge a called party. Thus, the invention is particularly useful in that it gives small operating companies the machinery required to capture the "B" commissions. Moreover, all of this is accomplished by means of an applique which may be added to either new or existing equipment at a minimum cost and with a minimum amount of modification.

While the principles of the invention have been described above in connection with specific apparatus and applications, it is to be understood that this description is made only by way of example and not as a limitation on the scope of the invention.

I claim:

1. A person-to-person, collect and special service calls automatic toll ticketing system comprising means for establishing toll calls through automatic toll ticketing equipment responsive to the receipt of certain digital signals, means in a central office associated with said equipment for making a voice recording of conversations during at least a portion of said toll calls, and means responsive to the receipt of a calling subscriber controlled signal for releasing said recording means and starting billing in said toll ticketing equipment.

2. The system of claim 1 and means for measuring a predetermined period of time following said establishment of said calls, and means for terminating any calls after said predetermined period of time if said release signal has not yet been received.

3. A person-to-person, collect and special service calls automatic toll ticketing system comprising automatic toll ticketing equipment means for establishing person-to-person, collect and special service calls toll calls to said equipment responsive to the receipt of at least a class-of-service signal, means responsive to other signals for extending a call to a called station, means in a central office for recording all voice signals transmitted after the establishing of said call to said called station, and means responsive to the receipt of a release signal originated by the calling subscriber for releasing said recording means for the duration of the call.

4. The system of claim 3 and means for measuring a predetermined period of time after the establishment of a person-to-person, collect and special service calls call, and means for terminating the calls after said predetermined period of time if said release signal has not been received.

5. A person-to-person, collect and special service calls toll ticketing system comprising toll ticketing means for recording the data necessary to make a toll ticket, means in a central office for recording voice signals while a person-to-person, collect and special service calls call is being completed, and means for recording at least some of said data in both of said recorder means, thereby associating the voice recording and toll ticket for comparison purposes.

6. The system of claim 5 and means responsive to the receipt of a subsequent control signal originated by the calling subscriber for releasing said voice recording means and starting to measure billable conversation time.

7. The system of claim 6 and means for measuring a predetermined period of time after completion of a person-to-person, collect and special service calls call, and means for terminating said call at the end of said period of time if said release control signal has not been received.

8. A person-to-person, collect and special service calls toll ticketing system comprising at least one telephone line, common equipment means for providing at least some data necessary to bill toll calls, ticketer means operated in part responsive to signals transmitted over said line and in part responsive to the output of said common means to make a toll ticket, means for recording the voice signals occurring on the line during establishment of the toll call, and means responsive to the output of said common means for simultaneously recording signals in said ticketer means and said voice recording means, thereby correlating said toll tickets and said voice recording.

9. The system of claim 8 wherein said common means comprises at least a clock-calendar circuit.

10. A person-to-person, collect and special service calls automatic toll ticketing system comprising means for establishing toll calls from a subscriber lines to automatic toll ticketing equipment responsive to the receipt of area code signals, means responsive to the receipt of class-of-service indicating signals for transmitting a recorded message giving special oral instructions for completing a call, and audio monitor means for making a voice recording of all electrical signals appearing on said line during establishment of said call.

11. A telephone system comprising local and distant offices, each serving a plurality of subscriber lines, automatic toll ticketing equipment, automatic switch means in both said local and said distant offices, means responsive to the receipt of switch control signals transmitted over a local line and identifying a distant line for interconnecting said local and distant lines via said toll ticket equipment, a voice recording device means responsive to prefix access signals for connecting the voice recording device to said line, means responsive to the receipt of answer supervision from said distant line for operating said recording means to monitor electrical signals appearing on the line while a calling subscriber challenges a called subscriber, means for measuring a predetermined period of time, means responsive to the receipt of a control signal originated by the calling subscriber before the end of said period of time for releasing said recording means and starting the billable timing of a toll ticket, and responsive to the end of said predetermined period of time for terminating the connection if said release control signal is not received.

12. A telephone system comprising local and distant subscriber lines, automatic toll ticketing equipment, automatic switch means, means responsive to the receipt of switch control signals identifying local lines for operating said switch means to interconnect said local lines, means responsive to the receipt of switch control signals identifying distant lines for interconnecting said local and distant lines via said toll ticketing equipment, announcer means for playing back a selected one of a plurality of recorded messages, means responsive to a prefix access signal for operating said announcer means to play back a selected one of said recorded messages, said message including instructions for completing a particular type of call that is identified by said access signals, and audio recording means for monitoring electrical conditions occurring on a line connected thereto while a calling subscriber follows said recorded instructions.

13. The system of claim 12 and means for measuring a predetermined period of time, means responsive to the receipt of a control signal originated by the calling subscriber before the end of said period of time for releasing said audio recording means and starting the billable timing of a toll ticket, and responsive to the end of said period of time for terminating the connection if said control signal has not been received.

14. The system of claim 13 and means for transmitting a "beep" tone to the calling subscriber while said audio recording means is connected to said line.

15. A telephone system comprising local and distant subscriber lines, automatic toll ticketing equipment, and automatic switch means; means responsive to the receipt of a prefix access signal for committing a subscriber to pay for a call at a predetermined billing rate; means responsive to the receipt of switch control signals identifying distant lines for interconnecting a calling local line and a called distant line via said toll ticketing equipment; audio recording means for monitoring electrical conditions occurring on the line connected thereto when said calling line is connected to said called line; and means responsive to coded signals originated by the calling subscriber for releasing said recording means, said release signal also including a designation of a billable rate.

References Cited by the Examiner

UNITED STATES PATENTS

| | | | |
|---|---|---|---|
| 2,385,968 | 10/45 | Deakin | 179—6 |
| 2,530,075 | 11/50 | Peterson | 179—6 |
| 2,535,510 | 12/50 | Ostline | 179—7.1 |
| 2,629,016 | 2/53 | Gooderham | 179—7.1 |
| 2,787,659 | 4/57 | Horwitz et al. | 179—6 |
| 2,848,543 | 8/58 | Breed et al. | 179—7.1 |
| 2,868,880 | 1/59 | Celentano | 179—6 |
| 2,946,852 | 7/60 | Brown et al. | 179—6 |

ROBERT H. ROSE, *Primary Examiner.*

WALTER L. LYNDE, *Examiner.*